United States Patent

[11] 3,573,607

| [72] | Inventors | Henry K. Whitesel<br>7 Melrob Court, Apt.4, Annapolis, 21403;<br>John F. Scarzello, 11215 Oak Leaf Dr.<br>Apt.1714, Silver Spring, Md. 20901 |
|---|---|---|
| [21] | Appl. No. | 756,136 |
| [22] | Filed | Aug. 29, 1968 |
| [45] | Patented | Apr. 6, 1971 |

[54] PROTON RESONANCE VOLUMETRIC FLOWMETER
10 Claims, 1 Drawing Fig.

| [52] | U.S. Cl. | 324/0.5, 73/194 |
|---|---|---|
| [51] | Int. Cl. | G01n 27/00 |
| [50] | Field of Search | 324/0.5 (Lit); 73/194 (E) (EM) |

[56] References Cited
UNITED STATES PATENTS

| 3,419,795 | 12/1968 | Genthe | 324/0.5 |
| 3,419,793 | 12/1968 | Genthe | 324/0.5 |

Primary Examiner—Michael J. Lynch
Attorneys—L. A. Miller, Q. E. Hodges and A. Sopp ABSTRACT: A flowmeter employing proton resonance for determining the rate of flow of a fluid through a pipe of nonmagnetic material. The relaxation of the perturbed magnetic moment is detected inductively by two pickup coils and the resulting signals are processed and combined electronically to give the desired measurement.

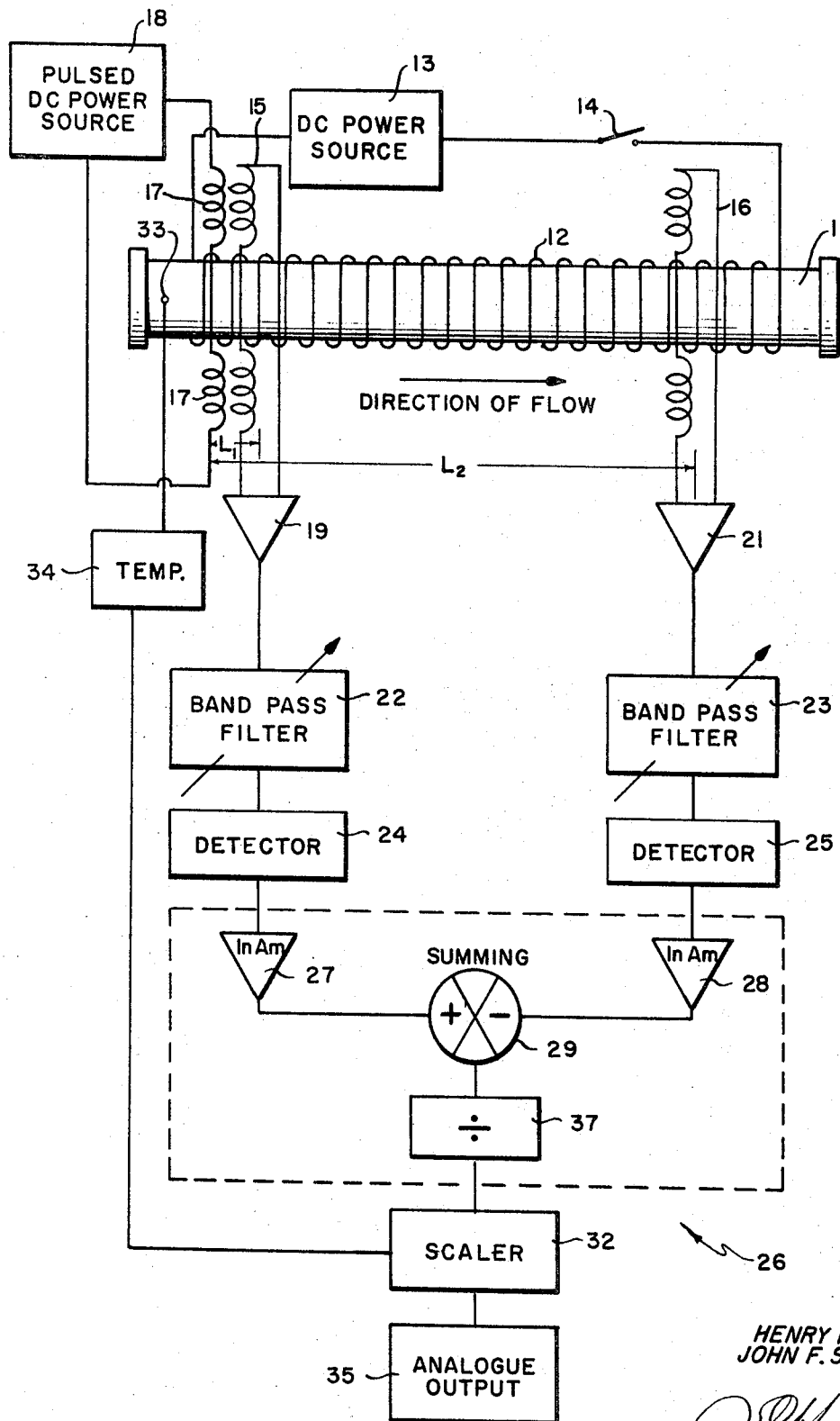

3,573,607

PROTON RESONANCE VOLUMETRIC FLOWMETER

The invention described herein may be manufactured and used by or for the Government of the United States of America for governmental purposes without the payment of any royalties thereon or therefor.

SUMMARY AND BACKGROUND

This invention relates generally to the measurement of fluid flow in pipes or conduits. More specifically the invention resides in a new approach to the measurement of fluid flow utilizing the proton resonance of the fluid.

Previous methods of measuring fluid flow have generally employed a sensing element disposed within the flow, such as impellers, pitot tubes, etc. or some structural penetration of the pipe. Such methods introduce dynamic disturbances into the flow which in many applications are undesirable. The present invention avoids these undesirable effects by depending for its operation upon the sensing of the occurrence of an induced atomic phenomena within the fluid flow which can be detected without affecting the fluid flow itself, i.e. the proton resonance of the fluid.

It is therefore an object of this invention to provide a flowmeter which does not disturb the flow of the fluid.

Another object of this invention is to determine the rate of flow of a fluid by detecting the change in its proton resonance condition.

These and other objects will become apparent from the following detailed description of the invention.

BRIEF DESCRIPTION OF THE DRAWING

The FIGURE is a functional diagram illustrating the invention.

This invention is based upon well-known phenomenon that certain substances possess nuclear magnetic properties. Among these properties is that of nuclear magnetic moment which gives rise to proton resonance. In quantum mechanics theory this moment is associated with electron spin. These protons when placed in a constant ambient magnetic field tend to align with the field, but due to the gyroscopic effect of their spin they precess instead.

This precession possesses a frequency given by the following equation:

$$f = \frac{\gamma}{2\pi} H_o$$

where $f$ is the Larmor precessional frequency in KCPS
$\gamma$ is the Gyromagnetic ratio (constant)
$H_o$ is the magnetic field in oersteds When the precessing magnetic moment of the proton is subjected to a perturbing magnetic field which is applied at an angle to the first or constant magnetic field, the moment is increased and is greatest when the perturbing field is perpendicular to the ambient. If this perturbing magnetic field is pulsed with sufficient time between pulses, the moment will try to realign itself with the ambient field. This realignment occurs in a finite time called the relaxation time and, for reference purposes herein, it is designated as $\tau$. This relaxation time is dependent on the viscosity of the fluid which in turn is related to the temperatures of the fluid.

DETAILED DESCRIPTION

The application of this theory to the present invention involves the construction of a device illustrated in the FIGURE in which numeral 11 refers to a section of tube or conduit made of a nonmagnetic material. Upon this tube is wound a solenoid 12 connected to be energized from a direct current source 13 through a switch 14. Mounted on the tube in spaced relation are two pickup coils 15 and 16. The spacing between the coils may be adjustable but must be accurately known.

Adjacent and on the upstream side of the solenoid 15 is mounted a second solenoid 17 which is oriented to produce a magnetic field at an angle, preferably at right angles to the ambient field produced by solenoid 12. This solenoid 17 is connected to a source of pulsed DC current 18.

In the preferred embodiment, this output of each of the pickup coils 15 and 16 is fed to respective amplifiers, 19 and 21 which may be of a preamplifier type. The amplifiers 19 and 21 feed through respective band-pass filters 22 and 23 to detectors 24 and 25 which are in the circuits of pickup coils 15 and 16, respectively.

The outputs of detectors 24 and 25 are fed to a voltage comparison circuit shown generally at 26. This comparison circuit 26 in the preferred embodiment, consists of logarithmic amplifiers 27 and 28, one for each of the inputs from the detectors 24 and 25, respectively. These amplifiers 27 and 28 feed into a summing circuit 29 whose output is fed to a divider circuit 31. The output of the divider circuit 31 is fed to a scaler 32 which also receives a temperature correction signal from a temperature sensor 33, which is mounted on the pipe upstream from the ambient field solenoid, and is fed through an amplifier circuit 34. The output of the scaler 32 is fed to an analogue output circuit 35 where it may be displayed or recorded by any suitable conventional means.

OPERATION

In operation, the section of nonmagnetic pipe or conduit 11 is installed in the flow circuit of the fluid whose volumetric flow rate is to be measured and the solenoid 12 is energized by closing switch 14 to connect the solenoid 12 to the source of direct current 13. This establishes the ambient magnetic field through which the fluid flows and determines by its strength the precession or resonant frequency of the proton magnetic moment in accord with the previously discussed equation, $$f = \frac{\gamma}{2\pi} H_o$$

The solenoid 17 is activated from the pulsed DC source to produce a perturbing magnetic field of short duration at right angles to the ambient field which results in the magnetic moment trajectory being larger than when influenced by the ambient field above. The presence of this disturbance is detected first by pickup coil 15 and at a slightly later time by coil 16 which responds to the changes in the magnetic flux field produced by the precission of the magnetic moments of the protons, i.e. (voltage)

$$e = \frac{d\phi}{dt}$$

(the derivative of flux with time). This difference in time is proportional to the rate of flow of the fluid while the amplitude of the disturbance detected by the coils 15 and 16 is related to the magnitude of the disturbance produced by solenoid 17 and the relaxation time $\tau$. Since the amplitude effect of the perturbing magnetic field, it is assumed tends to decay exponentially during the interval between pulses toward the amplitude associated with the ambient field along, the difference in the amplitude of the signal detected by coil 15 from that detected by the coil 16 together with the knowledge of the relaxation time and of the distance between the coils 15 and 16 give a measure of the velocity of flow. To implement this function the signal from each of the pickup coils is fed through its respective amplifiers 22 and 23 to detectors 24 and 25 where the frequency given by the equation $$f = \frac{\gamma}{2\pi} H_o$$

is detected. The two signals from the detectors 24 and 25 are fed to the voltage comparator circuit 26. In this circuit the equation for flow velocity $$u = \frac{L}{T(\ln v_1 - \ln v_2)}$$

is solved.

The equation $\quad u = \dfrac{L}{T(\ln v_1 - \ln v_2)}$ is derived from the FIGURE as follows:

$$t_1 = \frac{L_1}{u}$$

$$t_2 = \frac{L_2}{u}$$

where $t_1$ is the elapsed time for the perturbed particle to travel from the perturbing solenoid 17 to the first pickup coil 15 and $t_2$ is the time for a perturbed particle to travel from the solenoid 17 to the second pickup coil 16. The voltage induced in the pickup coils is given by:
where $V_1$ is the voltage induced in coil 15;
  $v_2$ is the voltage induced in coil 16;
  $e$ is the logarithmic constant;
  $L_1$ is the length from solenoid 17 to coil 15;
  $L_2$ is the length from solenoid 17 to coil 16;
  $\tau$ is the relaxation time; and
  $\mu$ is the rate of flow Then $L_2 - L_1 = L$ $$\frac{V_1}{V_2} = \frac{-\frac{L_1}{euT}}{-\frac{L_2}{euT}} = e^{\frac{1}{uT}(L_2 - L_1)} = e^{\frac{L_2}{uT}}$$

$$\ln \frac{V_1}{V_2} = \frac{L}{uT} = \ln v_1 - \ln v_2$$

$$u = \frac{L}{T(\ln v_1 - \ln v_2)}$$

Therefore, the logarithm of the voltage output of the detectors 24 and 25 is produced by the amplifiers 27 and 28 respectively. The output of the amplifiers 27 and 28 is algebraically added in summing circuit 29 and the quotient of $L$ (a constant) and the output of the summing circuit is taken in the divider circuit 37 where the constant also modifies the output of the summing circuit. This constant may be introduced in either the summing or dividing circuit. The output of the dividing circuit is fed to the scaler. In the scaler the compensation for temperature is introduced to correct the value of the relaxation time constant. The output of the scaler will then give the velocity of flow $\mu$, which may be displayed or recorded as desired. If the volumetric rate of flow is desired the value of the cross-sectional area of the pipe may be introduced into the scaler circuit.

It may be noted that the solenoid 17 is spaced from pickup coil 15 sufficiently to limit the interaction between them. However, if desired a magnetic shield could be interposed between them.

If the volumetric flow is desired the factor of the cross-sectional area of the pipe or conduit is introduced into the scaler as a constant for a particular application.

It is to be understood that in some applications permanent magnets could be substituted for the solenoids and that the amplifiers 19 and 21 might be omitted if the signals from the pickup coils are of sufficient strength to be detected by the detectors 24 and 25.

We claim:

1. A flowmeter for measuring the flow of a fluid through a conduit comprising:
   a first means for producing an unvarying magnetic field in said conduit;
   a second means for producing a pulsed magnetic field at a point in the fluid flowing through said conduit;
   said second means being mounted within the unvarying magnetic field produced by said first means and producing a magnetic field nonparallel to the field produced by said first means;
   said second means producing a perturbation in the fluid in the form of a precession of the proton magnetic moment about the direction of the unvarying field;
   third means producing a plurality of discrete signals, each signal having an amplitude proportional to the amplitude of the perturbation at each of a plurality of respective points;
   said plurality of points being spaced along the conduit in the direction of fluid flow and within the unvarying magnetic field; and
   fourth means for comparing the amplitudes produced by said third means and indicating the rate of fluid flow through the conduit.

2. A flowmeter as claimed in claim 1 in which said first means comprises a solenoid wound on said conduit and a source of power connected to said solenoid.

3. A flowmeter as claimed in claim 2 in which said second means comprises an electromagnetic coil and a power source connected to said electromagnetic coil.

4. A flowmeter as claimed in claim 1 in which said third means includes a first and second detection means mounted in spaced relation to each other along the direction of fluid flow through the conduit:
   said first and second detection means producing signals having voltage amplitudes proportional to the perturbations at the positions of the respective first and second detection means; and
   said fourth means includes a first voltage comparison means connected to receive the output of said first and second detection means, to compare the voltage amplitudes of the signals from the first and second detection means and producing an output indicative of the rate of flow in the conduit.

5. A flowmeter as claimed in claim 4 in which said first detection means is a coil:
   said second detection means is a coil;
   a first amplifier connected to receive the output of said first coil;
   a second amplifier connected to receive the output of said second coil;
   a first band-pass filter connected to receive the output of said first amplifier and tuned to the signal frequency associated with the proton spin of some preselected material;
   a second band-pass filter connected to receive the output of said second amplifier and tuned to the signal frequency of said first band-pass filter;
   a first detector connected to receive the output of said first band-pass filter and producing a voltage amplitude proportional to the amplitude of the perturbation of the proton spin at the position of said first coil;
   a second detector connected to receive the output of said second band-pass filter and producing a signal having a voltage amplitude proportional to the amplitude of the perturbation in the proton spin at the position of said second coil; and
   a first voltage comparison means connected to receive the outputs of said first and second detectors and producing an output indicative of the rate of flow of the fluid in said conduit.

6. A flowmeter as claimed in claim 4 in which said fourth means includes means for sensing the temperature of said fluid and producing an electrical signal proportional to such temperature and a second voltage comparison means connected to receive the output of the first comparison means and the output of said temperature sensing means to produce a temperature corrected measurement of the flow rate.

7. A flowmeter as claimed in claim 4 in which said first voltage comparison means includes first and second logarithmic amplifiers:
   said first logarithmic amplifier connected to receive the output of said first detector;
   said second logarithmic amplifier connected to receive the output of said second detector;
   a summing amplifier; and
   said summing amplifier connected to receive the output of said first logarithmic amplifier and the output of said second logarithmic amplifier whereby the signals received by said summing means are the logarithm of the signal amplitude detected by said first and second detection means.

8. A flowmeter as claimed in claim 1 in which said first means is a magnet mounted to establish a magnetic field longitudinally of a section of said conduit.

9. A device as claimed in claim 1 in which said second means is mounted to produce a magnetic field at right angles to the ambient field produced by said first means.

10. A method of measuring fluid flow of a fluid having nuclear magnetic moments comprising:
- subjecting the flowing fluid to an unvarying magnetic field over a measured distance;
- subjecting the flowing fluid to a pulsed magnetic field to introduce a perturbation in the form of a precession of the proton magnetic moment about the direction of the unvarying magnetic field;
- detecting the amplitude of the perturbation at two spaced apart points along the flow within the unvarying magnetic field to produce a signal proportional in amplitude to the magnitude of the precessing magnetic moment at each detection point; and
- processing the detected signals from the two detection points to solve the equation $$U = \frac{L}{T (\ln V_1 - \ln V_2)}$$

where $U$ is the fluid velocity;
$L$ is the space between the points of detection;
$\tau$ is the relaxation time for the particular fluid;
$V_1$ is the voltage amplitude at point one;
$V_2$ is the voltage amplitude at point two;
$\ln$ is the natural logarithm whereby the flow of a fluid through a conduit is measured.